US009335926B2

(12) United States Patent
Choi et al.

(10) Patent No.: US 9,335,926 B2
(45) Date of Patent: May 10, 2016

(54) DISPLAY APPARATUS FOR SENSING TOUCH INPUT AND TOUCH INPUT METHOD THEREOF

(71) Applicant: SAMSUNG ELECTRONICS CO., LTD., Suwon-si (KR)

(72) Inventors: Hyun-mook Choi, Seoul (KR); Jeong-hyun Park, Suwon-si (KR); Ju-yong Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 121 days.

(21) Appl. No.: 14/332,484

(22) Filed: Jul. 16, 2014

(65) Prior Publication Data
US 2015/0077356 A1 Mar. 19, 2015

(30) Foreign Application Priority Data

Sep. 16, 2013 (KR) ........................ 10-2013-0111063

(51) Int. Cl.
| | |
|---|---|
| *G06F 3/0488* | (2013.01) |
| *G06F 3/044* | (2006.01) |
| *G06F 3/14* | (2006.01) |
| *G09G 5/14* | (2006.01) |

(52) U.S. Cl.
CPC .......... *G06F 3/04886* (2013.01); *G06F 3/1423* (2013.01); *G09G 5/14* (2013.01); *G09G 2340/0442* (2013.01)

(58) Field of Classification Search
CPC ........ G06F 3/0488; G06F 3/044; G06F 3/045
See application file for complete search history.

(56) References Cited

U.S. PATENT DOCUMENTS 5,365,461 A * 11/1994 Stein ...................... G01B 7/004
                                                                 178/18.01
5,825,308 A * 10/1998 Rosenberg ............. G05G 9/047
                                                                 341/20

(Continued)

FOREIGN PATENT DOCUMENTS

| EP | 1164461 A1 | 12/2001 |
|---|---|---|
| EP | 2533235 A1 | 12/2012 |
| WO | 2012135256 A2 | 10/2012 |

OTHER PUBLICATIONS

Communication dated Oct. 31, 2014 issued by European Patent Office in counterpart European Patent Application No. 14179000.6.

*Primary Examiner* — Ricardo L Osorio
(74) *Attorney, Agent, or Firm* — Sughrue Mion, PLLC

(57) ABSTRACT

A display apparatus is provided. The display apparatus includes a communication interface configured to communicate with a plurality of image input devices, a display configured to display a plurality of images provided by the plurality of image input devices on a single screen, a storage configured to store screen scale information of the plurality of image input devices, a sensor configured to sense a touch input on one image of the plurality of images, and a controller configured to convert actual touch coordinate values of an entire screen of the display into relative touch coordinate values corresponding to an image input device which provides a touched image in which the touch input is sensed, according to the screen scale information of the image input device which provides the touched image in response to the touch operation being sensed, and transmit the converted relative touch coordinate values to the image input device which provides the touched image.

16 Claims, 9 Drawing Sheets

(56) References Cited

U.S. PATENT DOCUMENTS

| | | |
|---|---|---|
| 6,493,008 B1 | 12/2002 | Yui |
| 2004/0193371 A1* | 9/2004 | Koshiji ............. G01C 21/3688 701/455 |
| 2009/0115725 A1* | 5/2009 | Shemesh ............... G06F 3/0383 345/158 |
| 2010/0245270 A1* | 9/2010 | Nako .................... G06F 1/1626 345/173 |
| 2011/0043491 A1* | 2/2011 | Oh ........................ G06F 3/0234 345/177 |
| 2012/0198480 A1* | 8/2012 | Yasaki ................ G06F 9/45533 719/319 |
| 2012/0287044 A1 | 11/2012 | Bell et al. |
| 2013/0106908 A1 | 5/2013 | Ichieda |
| 2014/0184471 A1* | 7/2014 | Martynov ............. G06F 3/1423 345/1.2 |
| 2014/0210779 A1* | 7/2014 | Katsuta .................... G06F 3/044 345/174 |
| 2014/0320507 A1* | 10/2014 | Myung .................. G06T 13/80 345/474 |
| 2014/0340339 A1* | 11/2014 | Jung .................. G06F 3/03545 345/173 |

\* cited by examiner

DISPLAY APPARATUS FOR SENSING TOUCH INPUT AND TOUCH INPUT METHOD THEREOF

CROSS-REFERENCE TO RELATED APPLICATION

This application claims priority from Korean Patent Application No. 10-2013-0111063, filed on Sep. 16, 2013 in the Korean Intellectual Property Office, the disclosure of which is incorporated herein by reference, in its entirety.

BACKGROUND

1. Field

Apparatuses and methods consistent with the exemplary embodiments relate to a display apparatus capable of receiving a touch input and a touch input method thereof, and more particularly, to a display apparatus configured to sense an accurate touch input even in a state in which a plurality of images are simultaneously displayed and a touch input method thereof.

2. Description of the Related Art

Due to recent developments of electronic technologies, electronic products capable of sensing various touch inputs have been developed and used. In recent years, as display sizes of display apparatuses, such as televisions or monitors, have increased, simultaneously displaying a plurality of pieces of content on one screen has become popular.

FIG. 1 is a view which illustrates an operation of a display apparatus in the related art. Referring to FIG. 1, a display apparatus displays two pieces of content 21 and 22. The two pieces of content 21 and 22 may be provided from different image input devices 3 and 4. A touch module is provided for a screen of the display apparatus. However, in the display apparatus of the related art, the touch module is connected to a single image input device, and a touch recognized in the touch module is only provided to the single image input device.

As illustrated in FIG. 1, when the two image input devices 3 and 4 are connected to the display apparatus, only a first image input device 3 is coupled to the touch module. As a result, no change occurs on the second content 22 provided by a second image input device 4 even when a user touches a point 11-1 in an area in which the second content 22 is displayed. Since the touch module is coupled only to the first image input device 3, a touch input anywhere on the entire display screen is only recognized by the first image input device 3. Therefore, it is difficult for the user to control the second image input device 4 through a screen touch.

Generally, a size of a first content 21 provided by the first image input device 3 is different from a size of the touch module. Therefore, even when actual touch coordinate values are provided to the first image input device 3, it may be determined that a user's desired point in the first content 21 is not touched. Instead, it may be determined that a different point is touched. Accordingly, the first image input device 3 may malfunction.

SUMMARY

One or more exemplary embodiments may overcome the above disadvantages and other disadvantages not described above. However, it is understood that the exemplary embodiments are not required to overcome the disadvantages described above, and may not overcome any of the problems described above.

One or more exemplary embodiments provide a display apparatus capable of accurately recognizing a point touched by a user when a plurality of images provided from a plurality of image input devices are displayed, and a touch input method thereof.

According to an aspect of an exemplary embodiment, there is provided a display apparatus including: a communication interface configured to communicate with a plurality of image input devices; a display configured to display, on a single screen, a plurality of images provided by the plurality of image input devices; a storage configured to store screen scale information of the plurality of image input devices; a sensor configured to sense a touch input on one image of the plurality of images; and a controller configured to convert actual touch coordinate values of an entire screen of the display into relative touch coordinate values corresponding to an image input device, which provides a touched image in which the touch input is sensed, according to the screen scale information of the image input device which provides the touched image in response to the touch input being sensed, and transmit the converted relative touch coordinate values to the image input device which provides the touched image.

The controller may be further configured to store received screen scale information in the storage when the screen scale information of the plurality of image input devices is received through the communication interface.

The controller may be configured to display a user interface (UI) screen to receive the screen scale information of the plurality of image input devices in the display unit, and to store input screen scale information in the storage unit when the screen scale information is input through the UI screen.

The controller may be configured to display the plurality of images provided by the plurality of image input devices in the screen in a picture in picture (PIP) manner or a picture by picture (PBP) manner.

The controller may be configured to calculate relative touch coordinate values X' and Y' using the following Equations when a pixel resolution of the touched image is (A, B), a display resolution of the image input device which provides the touched image is (E, F), and the actual touch coordinate values are (X, Y).

$$X' = E * \frac{X}{A},$$
$$Y' = F * \frac{Y}{B}$$

The display may include a plurality of display devices, and the sensor may be disposed below each of the plurality of display devices to sense the touch operation on the plurality of display devices. The controller may also be configured to dispersedly display the plurality of images provided by the plurality of image input devices in the plurality of display devices, convert, when an image displayed in one of the plurality of display devices is touched, actual touch coordinate values of the sensor into relative touch coordinate values of a screen of the display device in which the touched image is displayed according to the screen scale information of the image input device, which provides the touched image in which the touch operation is sensed, and transmit the converted relative touch coordinates to the image input device which provides the touched image.

According to an aspect of another exemplary embodiment, there is provided a touch input method of a display apparatus, the method including: storing screen scale information of a plurality of image input devices; displaying a plurality of images provided by the plurality of image input devices on a single screen; sensing a touch input on one of the plurality of images; converting actual touch coordinate values of an entire screen into relative touch coordinate values corresponding to an image input device, which provides a touched image in which the touch input is sensed, according to the screen scale information of the image input device which provides the touched image in response to the touch input being sensed; and transmitting the converted relative touch coordinate values to the image input device which provides the touched image.

The method may further include receiving the screen scale information from the plurality of image input devices.

The method may further include displaying a user interface (UI) screen to receive the screen scale information of the plurality of image input devices.

The plurality of images may be displayed on the screen in a PIP manner or in a PBP manner.

The converting of the relative touch coordinate values may include calculating relative touch coordinate values (X', Y') using the following Equations when a pixel resolution of the touched image is (A, B), a display resolution of the image input device which provides the touched image is (E, F), and the actual touch coordinate values are (X, Y).

$$X' = E * \frac{X}{A},$$

$$Y' = F * \frac{Y}{B}$$

BRIEF DESCRIPTION OF THE DRAWINGS

The above and/or other aspects of the exemplary embodiments will be more apparent by describing certain aspects of the exemplary embodiments, with reference to the accompanying drawings, in which.

DETAILED DESCRIPTION OF EXEMPLARY EMBODIMENTS

Figure 1:
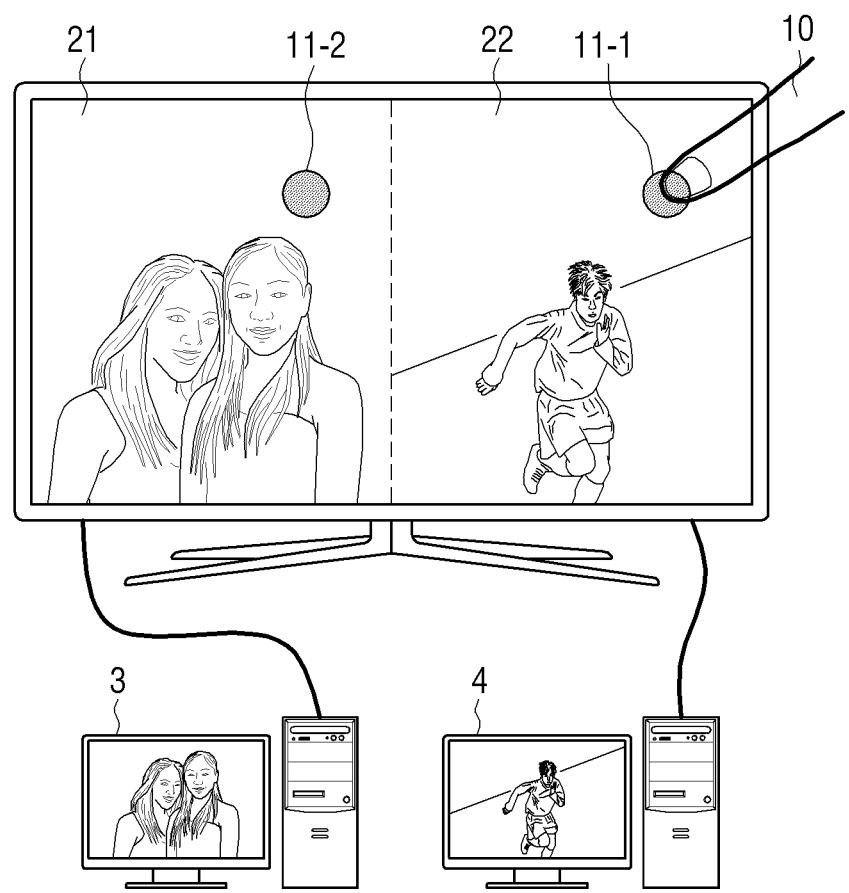
FIG. 1 is a view which illustrates an operation of a display apparatus in the related art.

Certain exemplary embodiments are described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. However, exemplary embodiments can be practiced without those specifically defined matters. Also, functions or elements known in the related art are not described in detail since they would obscure the exemplary embodiments with unnecessary detail.

Figure 2:
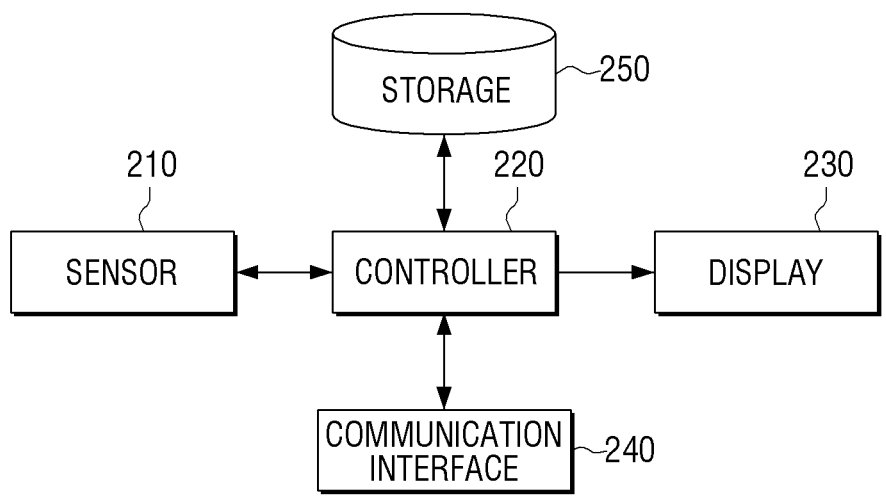
FIG. 2 is a block diagram which illustrates a display apparatus configured to sense a touch input according to an exemplary embodiment.

FIG. 2 is a block diagram which illustrates a display apparatus configured to sense a touch input according to an exemplary embodiment.

As shown in FIG. 2, the display apparatus 200 may include a sensor 210, a controller 220, a display 230, a communication interface 240, and a storage 250. The sensor 210 may be implemented as a single sensor or as a plurality of sensors.

The display apparatus 200 may simultaneously display images input through a plurality of image input devices on the display 230. When the images are simultaneously displayed, the display apparatus 200 may divide a screen displayed by the display equally and simultaneously display the images on the divided screen or simultaneously display the images in a PIP manner or a PBP manner. Exemplary embodiments of the display apparatus 200 may include various user terminal apparatuses such as a television, a portable phone, a tablet personal computer (PC), a laptop PC, a monitor, an electronic picture frame, a kiosk, a MPEG-1 audio layer 3 (MP3) player, or a portable multimedia player (PMP).

The communication interface 240 performs communication with the plurality of image input devices. The communication interface 240 may perform the communication with the image input devices through a wired interface such as a high definition multimedia interface (HDMI) or a digital visual interface (DVI) or through a wireless communication method such as Bluetooth, Zigbee, or a radio frequency (RF) communication. Exemplary embodiments of the image input device may include various apparatuses such as a PC, a laptop PC, a server, a recoding medium reproducing apparatus, a portable storage medium, a portable phone, or a tablet PC.

The storage 250 stores screen scale information of the display apparatus and screen scale information of the plurality of image input devices. Specifically, the screen scale information may include a resolution of the display apparatus 200 and resolutions of the plurality of image input devices. The screen scale information may also include arrangement information of images on a screen of the display 230. The storage 250 may be configured as a flash memory. In addition, the storage 250 may include a non-transitory computer-readable medium such as a Blu-ray disc, a universal serial bus (USB), a memory card, or a read only memory (ROM).

The display 230 may display a plurality of images input from the plurality of image input devices through the communication interface 240 on a single screen. The plurality of images input from the plurality of image input devices may be displayed on the display 230 using pre-stored screen scale information.

The plurality of images may be displayed on the display 230 in a PIP manner or in a PBP manner as described above or other various manners.

The sensor 210 is disposed below the display 230 to sense a touch input of a user. The touch method may include a capacitive touch method or a resistive touch method. The resistive touch method senses a touch by sensing a predetermined pressure, such as a pressure applied to the touch panel through a finger of the user, through a pen, or the like. The capacitive touch method senses a touch using static electricity, and a touch operation is performed by a direct touch of a touch panel using a portion of a body of the user or a conductive material.

When the user touches the screen in an area corresponding to one of the plurality of images provided by the plurality of image input devices, the sensor 210 senses the touch of the user and transmits sensing information to the controller 220. The sensing information indicates pixel coordinate values at an actually touched point.

The sensor 210 may be implemented with an independent touch module separately provided from the display 230. The sensor 210 may be connected to the controller 220 through various wired/wireless interfaces and may transmit the sensing information to the controller 220. Specifically, the sensor 210 may be connected to the controller 220 through a USB interface, a RS232 interface, or Bluetooth interface, or the like.

The controller 220 stores screen scale information of a plurality of images and arrangement information of the plurality of images, i.e., information about the arrangement of the plurality of images on the display 230, in the storage 250. The information is stored in the storage 250 to display the plurality of images provided from the plurality of image input devices. The screen scale information of the plurality of images may be provided from the plurality of image input devices through the communication interface 240. A user interface (UI) screen configured to receive the screen scale information of each of the plurality of image input devices may be displayed. The UI screen may be implemented through an on screen display (OSD) menu. The controller 220 may store the screen scale information input through the UI screen in the storage 250. In addition to the screen scale information and the number of the plurality of image input devices may be input through the OSC menu.

When the touch on the screen is sensed, the controller 220 calculates actual touch coordinate values for a touch point. The controller 220 identifies one of the plurality of image input devices including the actual touch coordinates using the screen scale information. The controller 220 calculates the actual touch coordinate values in an entire screen of the display 230 as actual touch coordinate values in a touched image. A detailed description of the calculation will be provided with reference to FIGS. 4 to 5.

The controller 220 converts the actual coordinate values in the touched image into relative coordinate values matching with a resolution of a screen of an image input device which provides the part of the screen which is touched using pre-stored screen scale information. The converted relative coordinate values are provided to the image input device, which provides the screen which is touched, through the communication interface 240 as conversion coordinate values. The process of converting the actual touch coordinate values into the relative touch coordinate values will be described in detail with reference to FIG. 3. Accordingly, the image input apparatus may accurately recognize the touch to perform a desired operation. For example, the desired operation may include accurate application execution, menu selection, or the like.

When a touch of the user is input through the sensor 210, the controller 220 may automatically convert the actual touch coordinate values into the relative touch coordinate values using the screen scale information pre-stored in the storage 250 and provide the converted relative touch coordinate values to the plurality of image input devices.

In the exemplary embodiment, the controller 220 functions to change the actual touch coordinate values to the relative touch coordinate values have been illustrated. However, the coordinate conversion may be performed using separate processor, and the coordinate conversion result may be provided to the controller 220 of the display apparatus 200 through a communication interface such as a USB interface.

Figure 3:
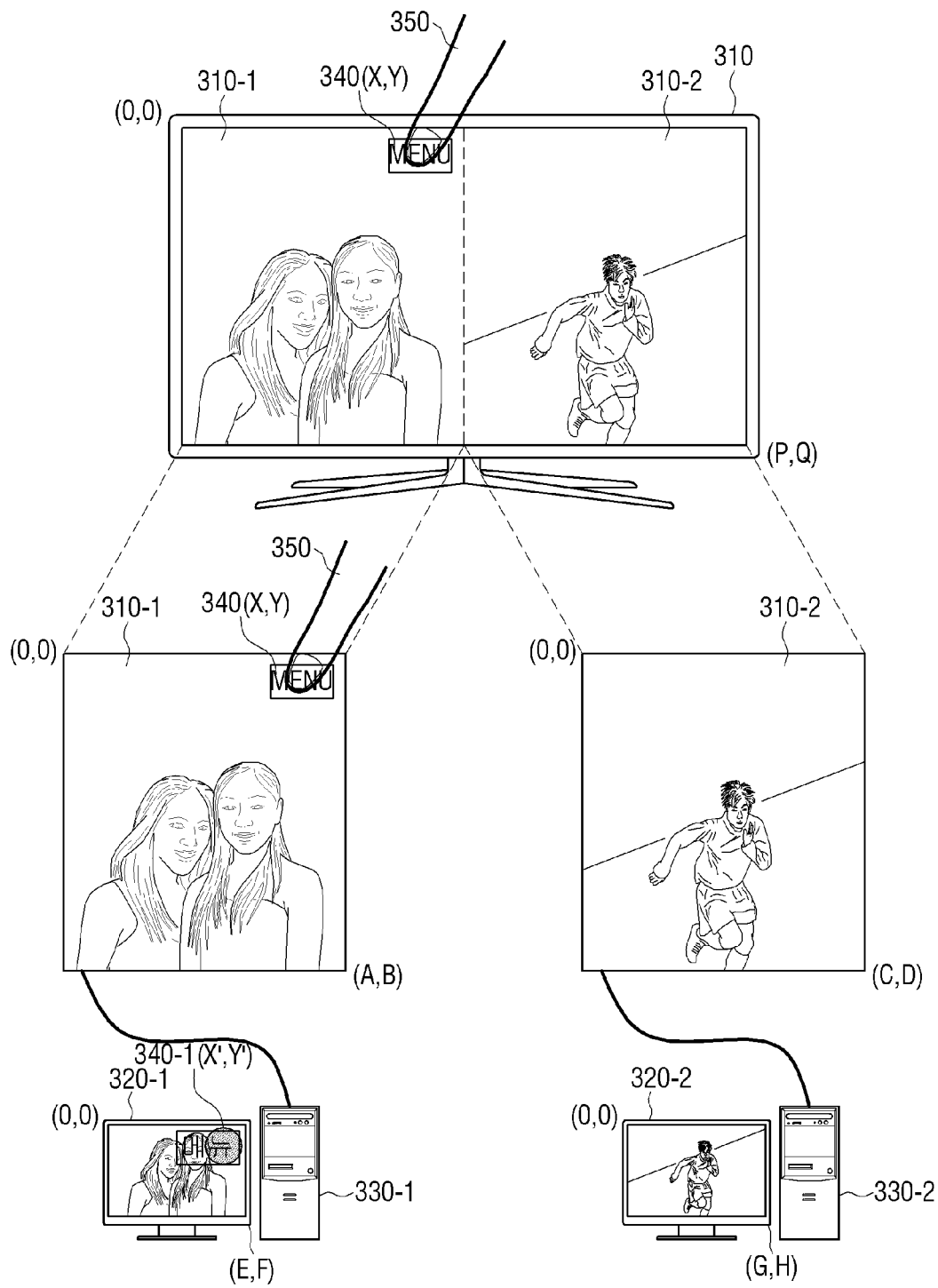
FIG. 3 is a view which illustrates a process of converting actual touch coordinate values into relative touch coordinate values.

FIG. 3 is a view which illustrates a process of converting actual touch coordinate values into relative touch coordinate values.

As shown in FIG. 3, the display apparatus includes a touch module.

A display 310 displays a first image 310-1 provided by a first image input device 330-1 and a second image 310-2 provided by a second image input device 330-2. When the resolution of the display unit 310 is (P, Q), the upper-leftmost coordinates in the touch module overall disposed below the display unit 310 are (0, 0), and the lower-rightmost coordinates in the touch module are (P, Q).

When the display 310 displays two images 310-1 and 310-2, a pixel resolution of the first image 310-1 is (A, B), and a pixel resolution of the second image 310-2 is (C, D), and the following equations are satisfied. P=A+C, and Q=B+D. In FIG. 3, when a resolution of a display 320-1 of the first image input device 330-1, which provides the first image is (E, F), coordinate values of the lower-rightmost pixel are (E, F) when coordinate values of the upper-leftmost pixel are (0, 0). When a resolution of a display 320-2 of the second image input device 330-2, which provides the second image, is (G, H), coordinate values of the lower-rightmost pixel are (G, H) when coordinate values of the upper-leftmost pixel are (0, 0).

An operation when a touch of a user 350 is sensed at a point of a menu 340 of the first image 310-1 will now be described. When actual touch coordinates of the menu 340 are defined as (X, Y), and relative touch coordinates of the first image input device 330-1 are defined as (X', Y'), the relative touch coordinates (X', Y') are derived from Equation I.

$$X' = E * \frac{X}{A},$$
$$Y' = F * \frac{Y}{B}$$

[Equation I]

The controller 220 calculates the relative touch coordinate values (X', Y') according to Equation I and provides the relative touch coordinate values to the first image input device 330-1.

When the actual touch coordinate values (X, Y) are converted into the relative touch coordinate values (X', Y') as described above, a menu 340-1 of the coordinates (X', Y') displayed in the display unit 320-1 of the first image input device 330-1 may be accurately selected. Therefore, the user may normally execute an application through the accurate menu selection.

The operation when a touch of the user is sensed in the second image 310-2 is similar to the above-described operation. Coordinate values of the lower-rightmost pixel are (C, D) of the second image 310-2, and coordinate values of the lower-rightmost pixel of the display 320-2 of the second image input device 330-2 are (G, H).

FIG. 3 shows that the touch of the user is input to the first image 310-1. However, when the touch of the user is input to the second image 310-2, actual touch coordinates are defined as (X, Y), and relative touch coordinates of the second input image device 330-2 are (X', Y'), and the relative touch coordinates (X', Y') may be derived from Equation II $$X' = G * \frac{X}{C},$$

[Equation II]

$$Y' = H * \frac{X}{D}$$

Figure 4:
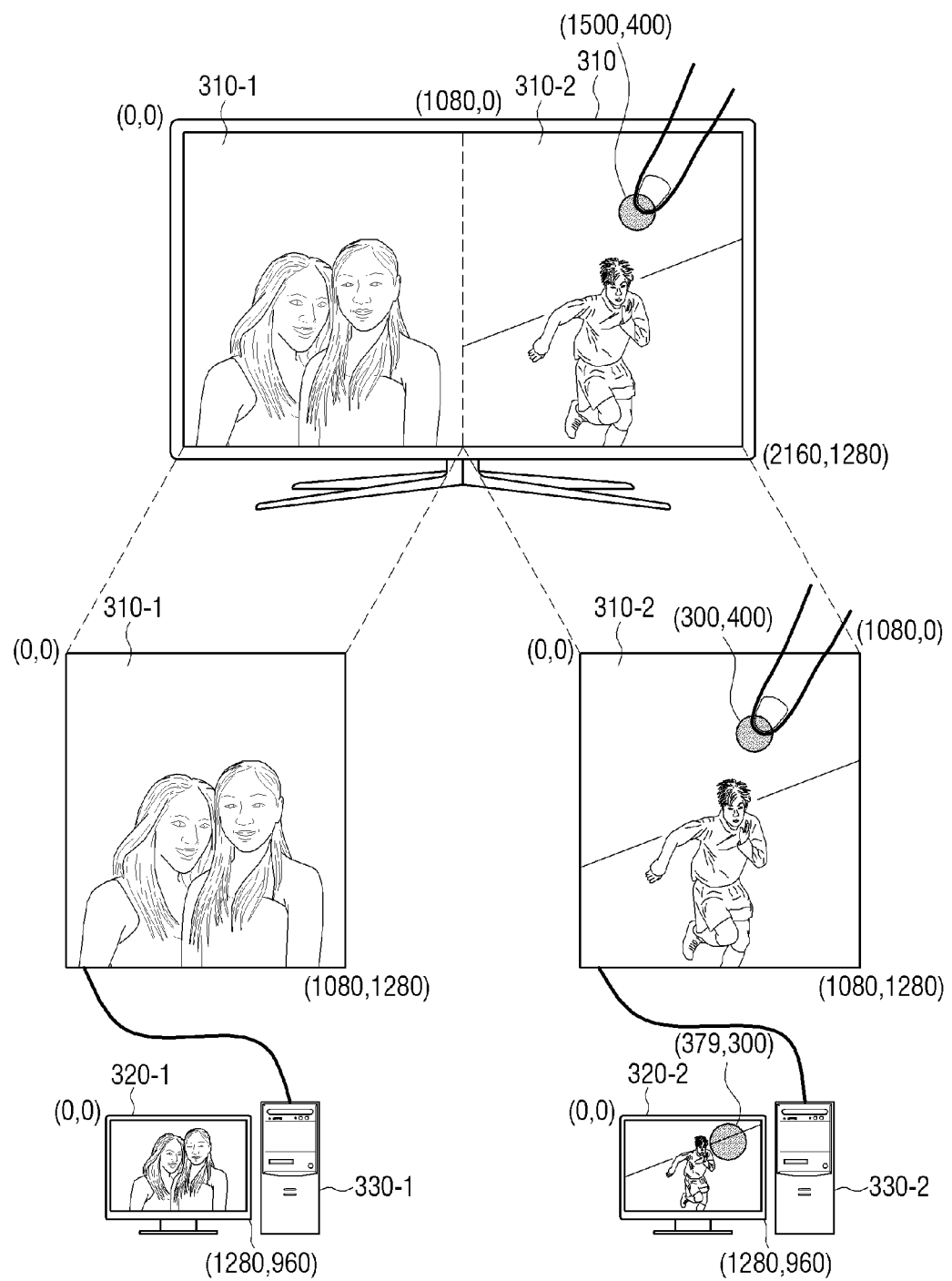
FIGS. 4 to 6 are views which illustrate operation processes of a touch input display apparatus according to various exemplary embodiments.
Figure 5:
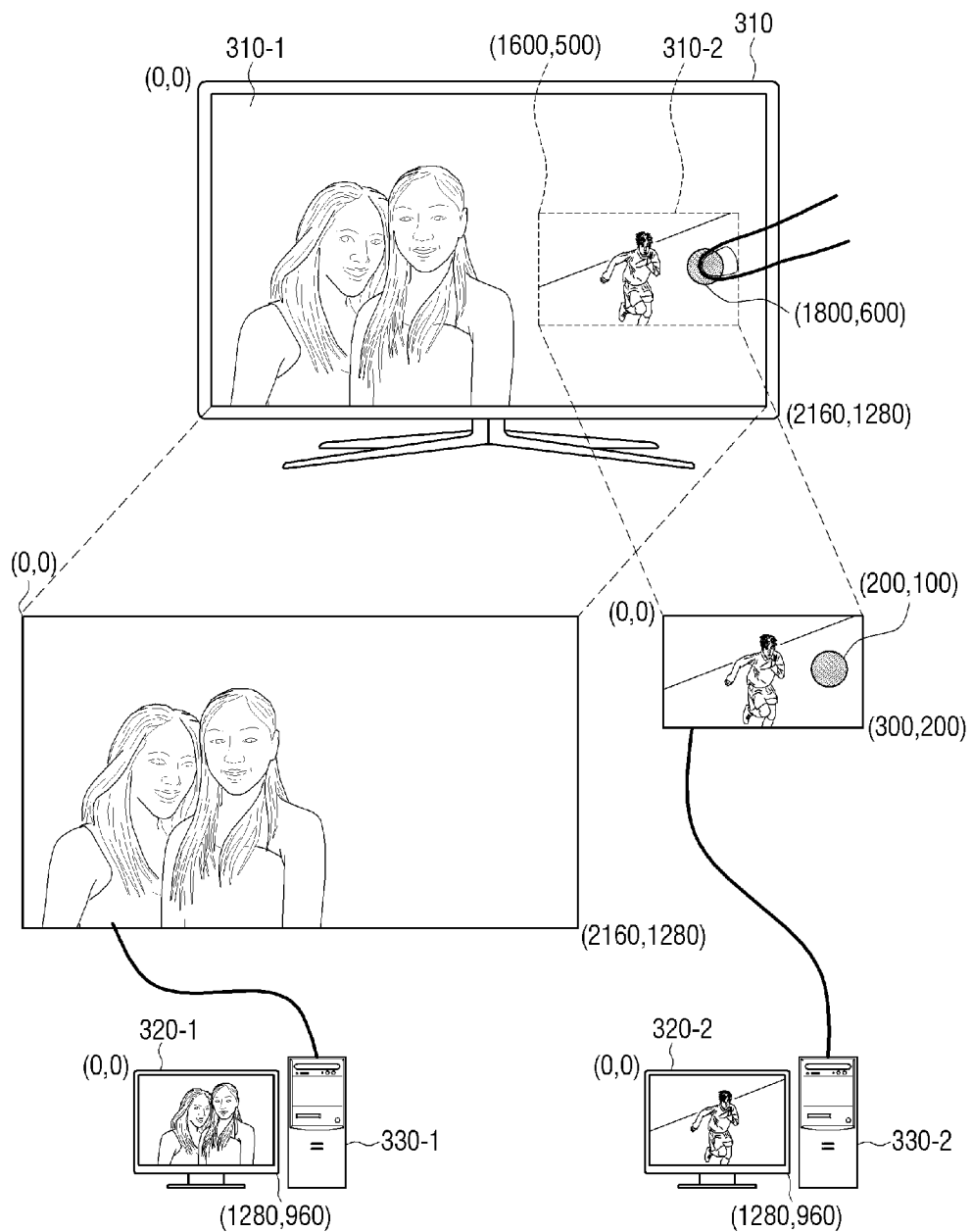
Figure 6:
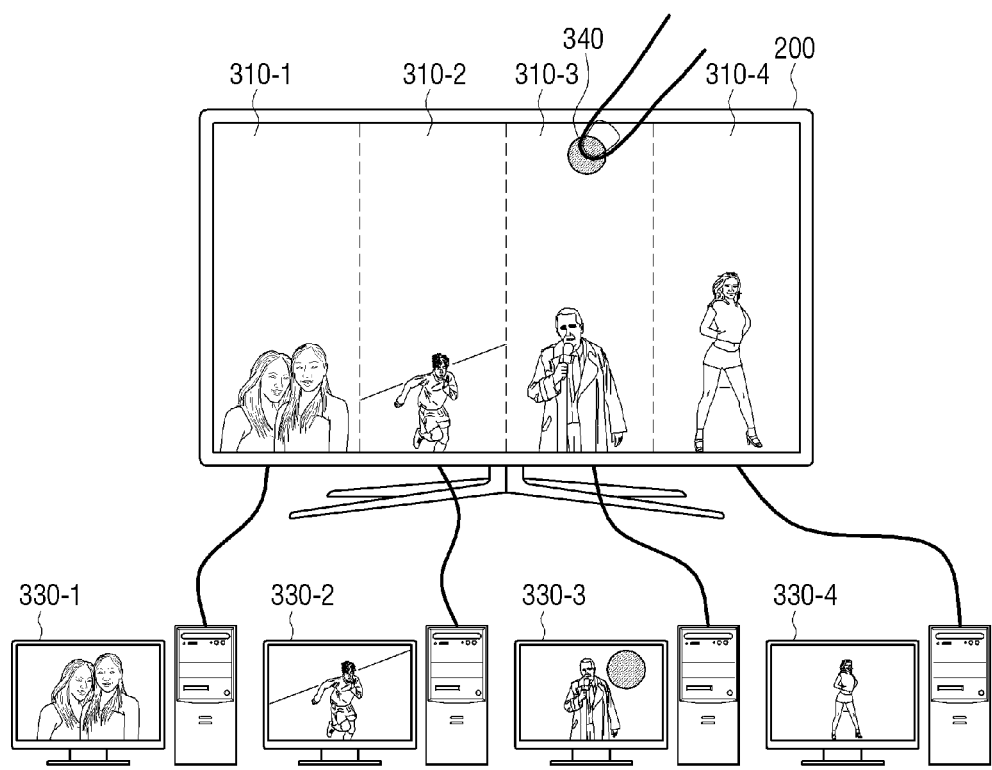

FIGS. 4 to 6 are views which illustrate operations of a display apparatus according to various exemplary embodiments.

As shown in FIG. 4, the display apparatus 200 is connected to a plurality of image input devices 330-1 and 330-2. The display 310 displays images provided by the plurality of image input devices 330-1 and 330-2 in divided areas 310-1 and 310-2. A screen resolution of the display unit is (2160, 1280), and a touch point of the user is (1500, 400).

When a touch of the user is sensed, the controller 220 converts an actual touch sensing point into actual touch coordinate values (1500, 400). Then, the controller 220 identifies one of the plurality of image input devices 330-1 and 330-2 which transmits an image using screen scale information of the plurality of image input devices 330-1 and 330-2 stored in the storage unit 250. In FIG. 4, the controller 220 identifies a second image input device 330-2. The actual touch coordinate values of the touch module in FIG. 4 are (1500, 400), and the touch coordinate values are (320, 400) on the basis of the second image 310-2. The controller 220 converts the touch coordinate values (320, 400) of the second image 310-2 into relative touch coordinate values corresponding to the second image input device 330-2 which provides the second image. The conversion method is the same as in FIG. 3.

Specifically, the controller converts the touch coordinate values into the relative touch coordinate values (X', Y') in a display 320-2 of the second image input device 330-2 using Equations I and II. That is, X'=1280*(320/1080)=379.25, and Y'=960*(400/1280)=300, and thus the relative touch coordinate values are (379, 300). The controller 220 provides data including the relative touch coordinate values to the second image input device 330-2. A decimal point in the coordinate values is removed.

In the exemplary embodiment, that the controller of the display apparatus 200 performs the touch coordinate conversion operation. However, the touch coordinate conversion operation may also be performed by a separate processor, and the touch coordinate conversion result may be transmitted to the controller 220 through an interface such as a USB interface. When the sensor 210 is implemented by an independent touch module as described above, the processor and the interface may be embedded in the touch module.

As shown in FIG. 5, when a first image 310-1 is provided by a first image input device 330-1, and a second image 310-2 is provided by a second image input device 330-2, the second image 310-2 is arranged in the first image 310-1. In the exemplary embodiment shown in FIG. 5, the resolution of the second image is (300, 200), and the upper-leftmost coordinate values are (1600, 500). The other configuration is the same as the configuration shown in FIG. 4, and therefore, a detailed description thereof will be omitted.

The actual touch coordinates (1800, 600) of an entire screen of the display 310 are converted into coordinates (200, 100) of the touched screen. Next, the controller 220 converts touch coordinate values into relative coordinate values (X', Y') of the display 320-2 of a second image input device 330-2 using Equations I and II described with regard to FIG. 3. Specifically, X'=1280*(200/300)=853.33, and Y'=960*(1/2)=480, and thus the relative touch coordinate values are (853, 480). A decimal point in the coordinate values is removed. The controller 220 provides data including the relative coordinate values to the second image input device 330-2.

As shown in FIG. 6, the display apparatus 200 is connected to a plurality of image input devices 330-1, 330-2, 330-3, and 330-4, and a display 310 displays images provided by the plurality of image input devices 330-1, 330-2, 330-3, and 330-4 in divided areas 310-1, 310-2, 310-3, and 310-4. The image input devices may be additionally connected to the display apparatus, and only portions of the images of the connected image input devices may be displayed on the display 310. The conversion of actual touch coordinates into relative touch coordinates may be performed as described in conjunction with FIGS. 4 and 5, and therefore, detailed description thereof will be omitted.

Figure 7:
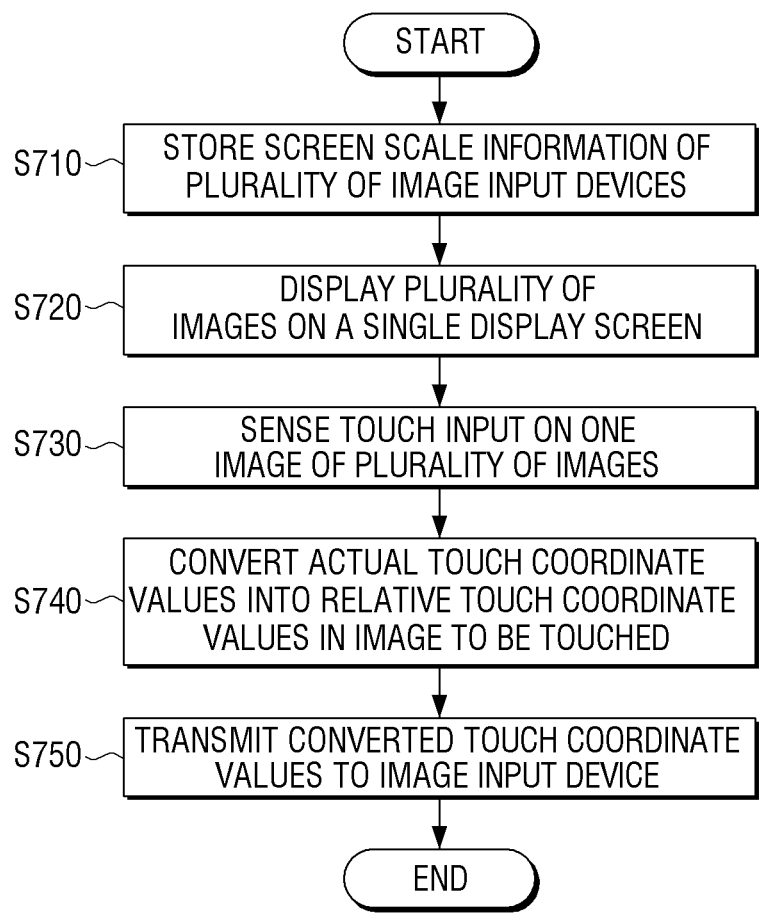
FIG. 7 is a flowchart of a touch input method according to an exemplary embodiment.

FIG. 7 is a flowchart of a touch input method according to an exemplary embodiment.

First, the display apparatus stores screen scale information of a plurality of image input devices (S710).

The screen scale information may be received from the plurality of image input devices. The screen scale information of the plurality of image input devices includes screen resolutions of the plurality of image input devices. The screen scale information may include a resolution of an entire screen, a number of the plurality of image input devices, a number of images to be displayed on the screen, and a screen arrangement of the plurality of images.

The screen scale information of each of the plurality of image input devices may be input through a UI screen. An exemplary embodiment of the UI screen may be an OSD menu screen. The screen may be divided using pre-stored screen scale information. Images of the plurality of images may not entirely be displayed. Instead, only portions of the plurality of images may be displayed on the divided screens.

The process of converting actual touch coordinate values of an entire screen into relative touch coordinate values of a touch image using the screen scale information and transmitting the relative touch coordinate values to the image input device is shown in detail in FIGS. 5 and 6, and thus detailed description thereof will be omitted.

The display apparatus displays the plurality of images provided by the plurality of image input devices on a single display screen (S720). An exemplary embodiment of the image input device includes a personal computer (PC) as described above. When the plurality of images are displayed on the screen, the screen may be previously divided. The plurality of images may be displayed on the screen in a PIP manner or in a PBP manner.

The display apparatus senses a touch input on a single image of the plurality of images (S730). The touch method may be a capacitive touch method or a resistive touch method. The resistive touch method senses a touch by sensing a pressure such as a pressure applied to the touch panel through a finger of the user, through a pen, or the like. The capacitive touch method senses a touch using static electricity, and a touch operation is performed by a direct touch of a touch panel by a portion of a body of the user or a conductive material.

When the touch is sensed, the display apparatus converts actual touch coordinate values of an entire screen into relative touch coordinate values corresponding to an image input device, which provides an image in which the touch is sensed, according to the screen scale information of the image input device which provides the touched image (S740).

The display apparatus transmits the converted relative touch coordinate values to the image input device which provides the touched image (S750). The image input device which receives the relative touch coordinate values may execute various applications through accurate touch sensing.

The touch input method of a display apparatus may be applied to the above-described display apparatus capable of a touch input. Further, the touch input method may be variously applied to apparatuses other than the above-described apparatus.

Figure 8:
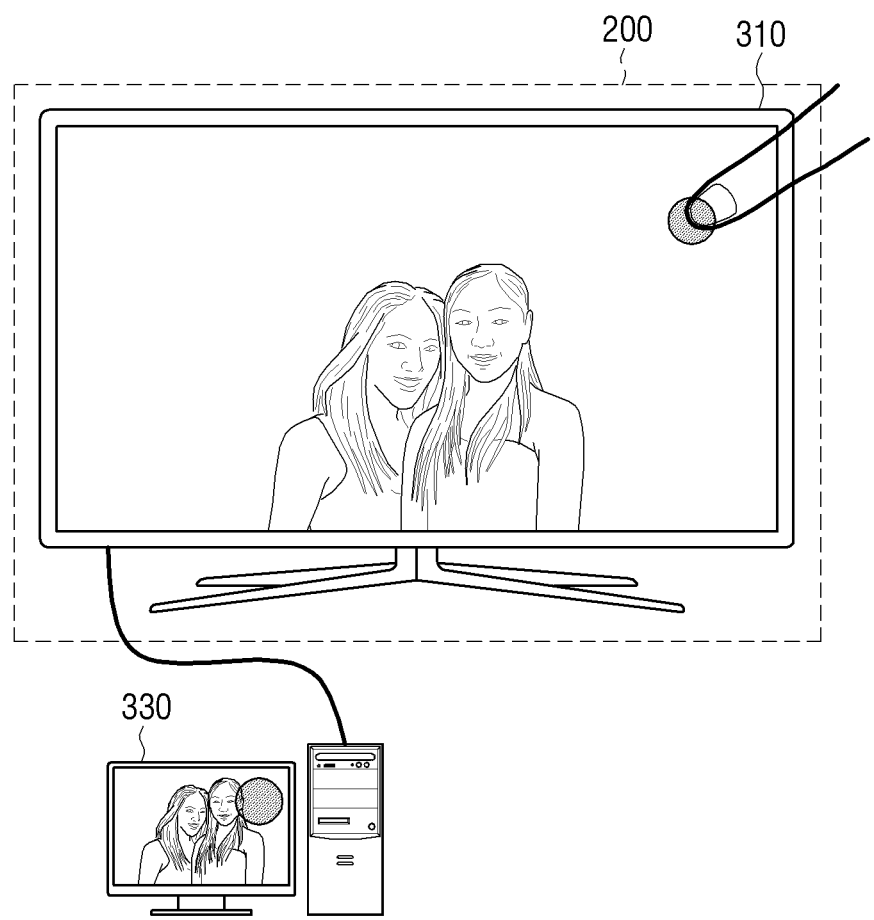
FIG. 8 is a schematic diagram which illustrates a display apparatus according to another exemplary embodiment.

FIG. 8 is a schematic diagram which illustrates a display apparatus according to another exemplary embodiment.

As shown in FIG. 8, one image input device 330 is provided, and a sensor disposed below a display 310 senses a touch input on the display apparatus 200. The controller display an image provided by the image input apparatus 330. When the touch is sensed, the display apparatus converts actual touch coordinate values of an entire screen of the display unit 310 into relative touch coordinate values of a screen area of the display apparatus 200 in which a touched image is displayed, and transmits the converted relative touch coordinate values to the image input device which provides the touched image.

In the exemplary embodiment, the display apparatus is not connected to a plurality of image input devices, but instead, is connected to a single image input device.

In the exemplary embodiment, the controller 220 converts the actual touch coordinate values into the relative touch coordinate values. However, the coordinate conversion may also be performed by a separate processor, and the relative touch coordinate values may be transmitted to the display apparatus through a transmission interface, such as a USB interface.

Figure 9:
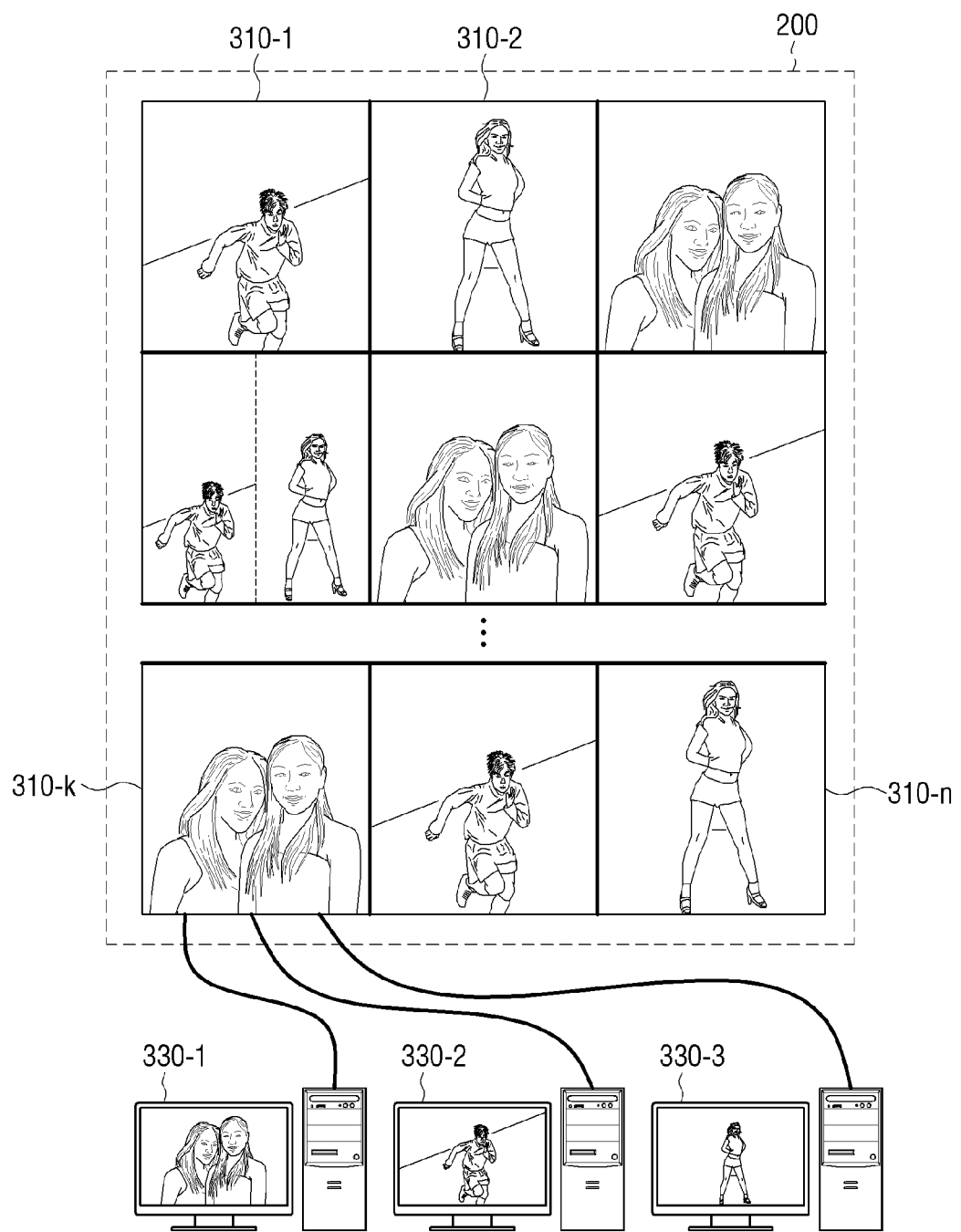
FIG. 9 is a schematic diagram which illustrates a display apparatus according to another exemplary embodiment.

FIG. 9 is a schematic diagram which illustrates a display apparatus according to another exemplary embodiment.

As shown in FIG. 9, the display apparatus 200 may include a plurality of display devices 310-1 to 310-n. Touch operations on the plurality of display devices may be sensed through a sensor disposed below the plurality of display devices 310-1 to 310-n. The plurality of display devices 310-1 to 310-n may dispersedly display a plurality of images provided by a plurality of image input devices 330-1, 330-2, and 330-3. Actual touch coordinate values of an entire screen of the plurality of display devices 310-1 to 310-n may be converted into relative touch coordinate values of a screen area of a display device in which a touched image is displayed when the touch input is sensed. The converted relative touch coordinate values may be transmitted to the image input device which provides the touched image.

The plurality of image input devices 330-1, 330-2, and 330-3 may be connected to a main display device 310-k of the plurality of display devices 310-1 to 310-n. The plurality of image input devices 330-1, 330-2, and 330-3 may transmit the plurality of images to the main display device 310-k. Subsequently, a controller of the main display device 310-k may transmit images to other display devices in a daisy-chain manner. The daisy-chain method is a method in which a signal is transmitted through a bus. The main display device 310-k provides the images of the plurality of image input devices 330-1, 330-2, and 330-3 to the plurality of display devices. A storage of the main display device 310-k may store resolutions and locations of the plurality of display devices, resolutions and locations of the plurality of image input devices, or the like. The operations of the display devices may be performed through the methods described in FIGS. 4 and 5.

The touch input methods of a display apparatus configured to sense a touch input according to the above-described various exemplary embodiments may be implemented by a computer program and may which may be provided to display apparatuses.

The computer program may be stored in a non-transitory computer-recordable medium, and executed by a controller or processor to perform the touch input method of a display apparatus including displaying a plurality of images provided by a plurality of image input devices on a single screen, sensing a touch on one of the plurality of images, converting actual touch coordinate values of an entire screen into relative touch coordinate values of a touched image when the touch is sensed, and transmitting the converted relative touch coordinate values to an image input device which provides the touched image.

The non-transitory computer-recordable medium is not a medium configured to temporarily store data such as a register, a cache, or a memory but a computer-readable medium configured to semi-permanently store data. The above-described various applications or programs may be stored in the non-transitory apparatus-readable medium such as a compact disc (CD), a digital versatile disc (DVD), a hard disc, a Blu-ray disc, a USB, a memory card, or a read only memory (ROM), and provided.

According to the above-described exemplary embodiments, a touch input on a display apparatus may be accurately recognized, and thus convenience of the user and accuracy and efficiency of the apparatus may be improved.

The foregoing embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus comprising:
    a communication interface configured to communicate with a plurality of image input devices;
    a display configured to display, on a single screen, a plurality of images provided by the plurality of image input devices;
    a storage configured to store screen scale information of the plurality of image input devices;
    a sensor configured to sense a touch input on one image among the plurality of images; and
    a controller configured to convert actual touch coordinate values of an entire screen of the display into relative touch coordinate values corresponding to an image input device which provides a touched image in which the touch input is sensed, according to the screen scale information of the image input device which provides the touched image in response to the touch input being sensed, and transmit the converted relative touch coordinate values to the image input device which provides the touched image.

2. The display apparatus as claimed in claim 1, wherein the controller is further configure to store received screen scale information in the storage in response to the screen scale information of the plurality of image input devices being received through the communication interface.

3. The display apparatus as claimed in claim 1, wherein the controller is further configured to display a user interface (UI) screen to receive the screen scale information of the plurality of image input devices in the display unit, and store input screen scale information in the storage in response to the screen scale information being input through the UI screen.

4. The display apparatus as claimed in claim 1, wherein the controller is further configured to display the plurality of images provided by the plurality of image input devices on the screen in a picture in picture (PIP) manner or a picture by picture (PBP) manner.

5. The display apparatus as claimed in claim 1, wherein the controller is further configured to determine relative touch coordinate values X' and Y' as:

$$X' = E * \frac{X}{A},$$
$$Y' = F * \frac{Y}{B},$$

where a pixel resolution of the touched image is (A, B), a display resolution of the image input device which provides the touched image is (E, F), and the actual touch coordinate values are (X, Y).

6. The display apparatus as claimed in claim 1, wherein the display comprises a plurality of display devices,
wherein the sensor is disposed below the plurality of display devices to sense the touch operation on the plurality of display devices, and
wherein the controller is further configured to dispersedly display the plurality of images provided by the plurality of image input devices in the plurality of display devices, convert, in response to an image displayed in one of the plurality of display devices being touched, actual touch coordinate values of the sensor into relative touch coordinate values of a screen of the display device in which the touched image is displayed according to the screen scale information of the image input device, which provides the touched image in which the touch operation is sensed, and transmit the converted relative touch coordinates to the image input device which provides the touched image.

7. A touch input method of a display apparatus, the method comprising:
storing screen scale information of a plurality of image input devices;
displaying a plurality of images provided by the plurality of image input devices on a single screen;
sensing a touch input on one of the plurality of images;
converting actual touch coordinate values of an entire screen into relative touch coordinate values corresponding to an image input device which provides a touched image in which the touch input is sensed, according to the screen scale information of the image input device which provides the touched image in response to the touch input being sensed; and
transmitting the converted relative touch coordinate values to the image input device which provides the touched image.

8. The method as claimed in claim 7, further comprising receiving the screen scale information from the plurality of image input devices.

9. The method as claimed in claim 7, further comprising displaying a user interface (UI) screen to receive the screen scale information of the plurality of image input devices.

10. The method as claimed in claim 7, wherein the plurality of images are displayed on the screen in a picture in picture (PIP) manner or a picture by picture (PBP) manner.

11. The method as claimed in claim 7, wherein the converting of the relative touch coordinate values includes determining relative touch coordinate values (X', Y') as:

$$X' = E * \frac{X}{A},$$
$$Y' = F * \frac{Y}{B},$$

where a pixel resolution of the touched image is (A, B), a display resolution of the image input device which provides the touched image is (E, F), and the actual touch coordinate values are (X, Y).

12. A non-transitory computer-readable medium having stored thereon a computer program that is executed to perform the method of claim 7.

13. A display system comprising:
a plurality of display devices configured to dispersedly display a plurality of images provided by a plurality of image input devices;
a sensor disposed below each of the plurality of display devices;
a controller configured to convert actual touch coordinate values of an entire screen of the plurality of display devices into relative touch coordinate values of a screen area of a display device in which a touched image is displayed in response to a touch input being sensed by the sensor, and transmit the converted relative touch coordinate values to an image input device which provides the touched image.

14. The display system as claimed in claim 13, wherein the plurality of image input devices are connected to a main display device selected from the plurality of display devices,
wherein the plurality of image input devices are configured to transmit the plurality of images to the main display device,
wherein the main display device comprises a main display controller configured to transmit images to the other display devices of the plurality of display devices in a daisy-chain manner.

15. The display system as claimed in claim 14, wherein the main display device comprises a storage, and
wherein the main display controller is further configured to store, in the storage of the main display device, resolution information and location information of the plurality of display devices and resolution information and location information of the plurality of image input devices.

16. The display system as claimed in claim 13, wherein the main display controller is further configured to transmit images in a daisy-chain manner by transmitting a signal through a bus to the other display devices.

* * * * *